Nov. 11, 1969  P. S. BEZANIS  3,477,074
ANTI-SHARK SAFETY DEVICE
Filed May 8, 1967  2 Sheets-Sheet 1
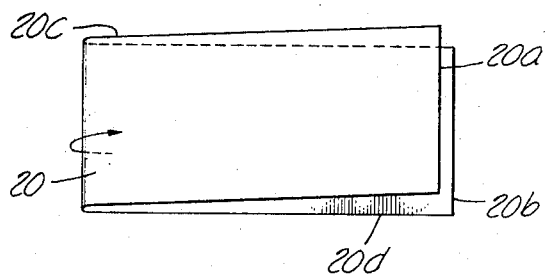
FIG. 1.
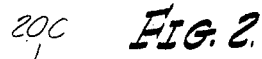
FIG. 2.
FIG. 3.
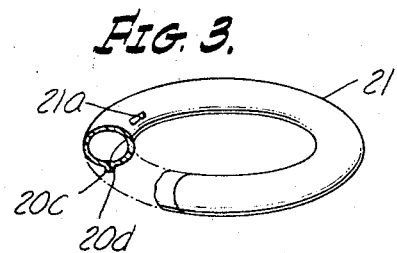
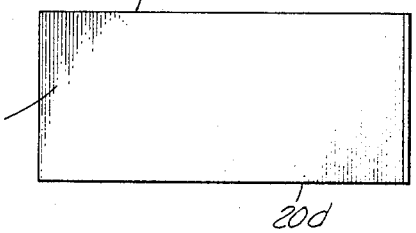
FIG. 4.
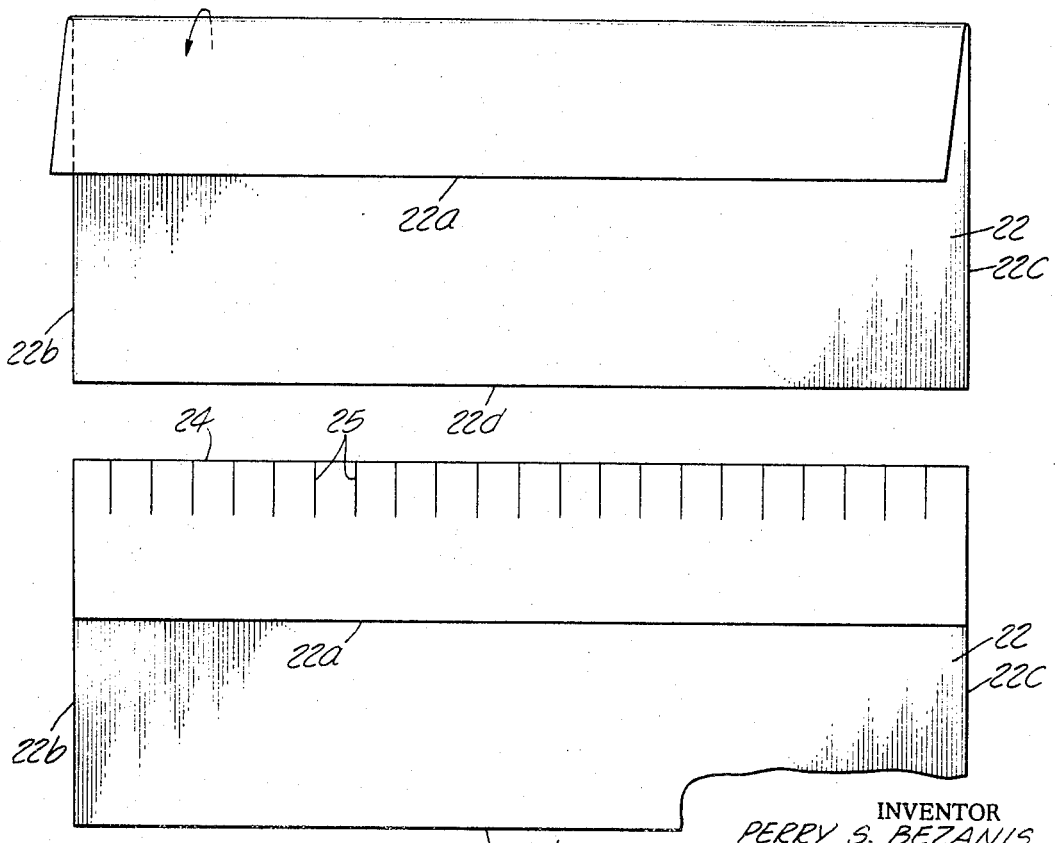
FIG. 5.
INVENTOR
PERRY S. BEZANIS
BY Roman A. Dimes
ATTORNEY

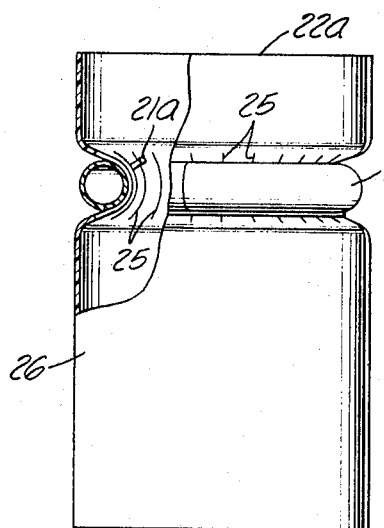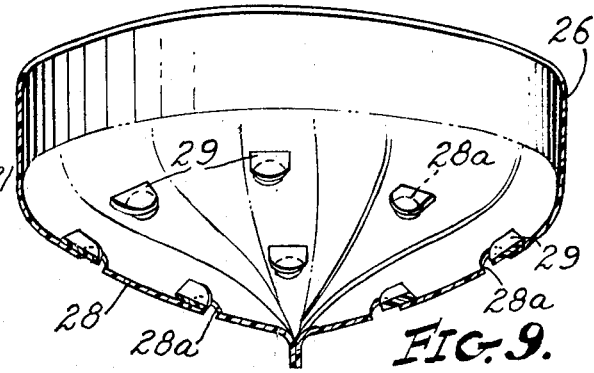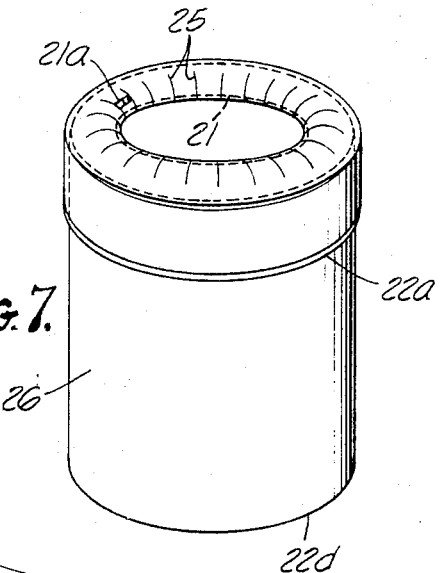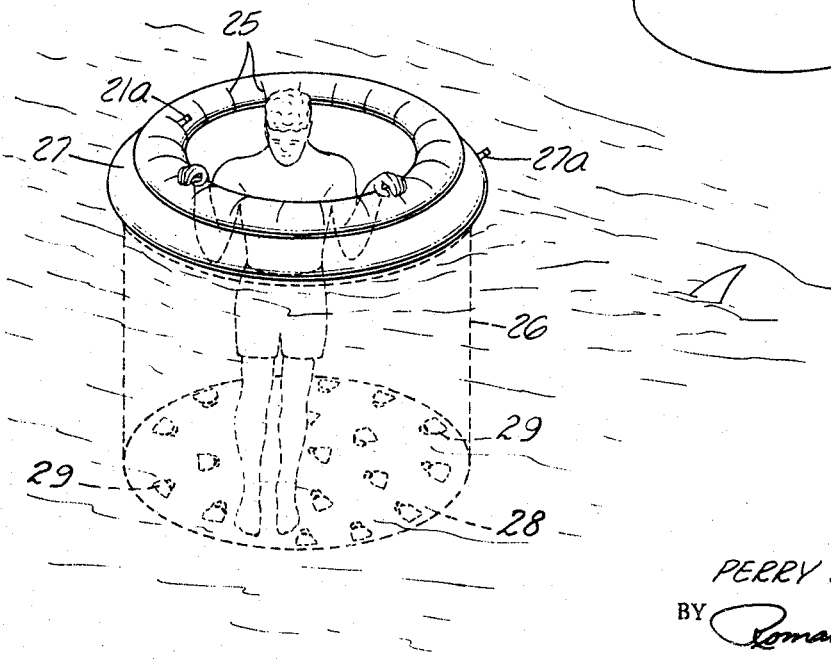

United States Patent Office 3,477,074
Patented Nov. 11, 1969

3,477,074
ANTI-SHARK SAFETY DEVICE
Perry S. Bezanis, 811 W. 29th,
San Pedro, Calif. 90731
Filed May 8, 1967, Ser. No. 642,629
Int. Cl. B63c 9/04, 9/16
U.S. Cl. 9—11                                12 Claims

ABSTRACT OF THE DISCLOSURE

This invention relates to an anti-shark safety device for humans which consists of floatable hollow sections provided with extended sidewalls and bottom thereby forming a cup-like structure which is unattractive to a shark by elimination or diminution of motion, visibility, sound and odor.

---

This invention relates to anti-shark safety devices, and more particularly to anti-shark safety devices to protect human beings.

Throughout the years, man's interest in dominating his environment has brought him into contact with sharks in two major impact points. Firstly, sharks inflict a very severe economic loss upon commercial fisheries, particularly in damage to fishing gear and to catches made by the gear, and spoil recreational fishing activities in some areas under some conditions. Secondly, sharks attack, maim and kill humans under certain conditions.

The most severe losses from sharks in United States fishing operations occur in tuna purse seining, in shrimp trawling and in trawling for bottom fishes.

Recreational use of the sea is often reduced either because of well grounded fear of sharks or because of caution arising from doubts about the real nature and extent of the hazard. Indirectly, this may have serious economic consequences to business near beach resorts. The consequences of just one well-publicized attack on a bather can result in substantial economic loss to a community.

The choice of protective device useful to the lone man who for one reason or another faces a dangerous shark is limited in several ways. It must be light in weight and easily carried. It must be operable under water and function either constantly or when activated by the user. It must be safe for the user to carry and suitable for use under adverse conditions. It should be relatively inexpensive if it is to be widely used. And, finally, it must be reasonably effective to drive a shark away or to thwart or avoid an attack.

One feature of the shark hazard needs special emphasis. Not all kinds of sharks respond to deterrent actions in the same way or in the same degree. Furthermore, there appear to be important individual differences among sharks of the same species. It is not possible to predict with any certainty the types of response specific actions will elicit from sharks.

Some devices may be effective under special conditions or against certain kinds of sharks, but still not be satisfactory for general use. Explosives or special guns, for example, would, if widely used, be almost certain to kill or injure more men than sharks. Furthermore, an explosive noise may attract sharks from otherwise safe distances.

If released by a man in the water, poisons or irritants of sufficient strength to promise protection against sharks are extremely dangerous to the man. Up to the present time, no selective poison or irritant with strong specific and selective action against sharks has been found. Devices for injecting poisons into sharks have some of the disadvantages for general use already mentioned in connection with explosive devices.

Electrical devices may eventually be so developed that they can produce predictable repelling stimuli to sharks, but, until now, attempts to deter sharks with such devices have been inconclusive or unsuccessful.

Lifeboats have been the main defense for humans against shark attacks. However, the cost of these boats is relatively excessive. They are difficult to fabricate and a number of them are required for adequate protection.

Although the olfactory senses of sharks are well developed, some measure of proximity is required. The visual acuity of the shark is sufficiently poor so that in the absence of sound, an idible is defined on the bases of size, color or glitter and presence of motion. Sound alone remains as the one great attractant to sharks. In the absence of noise, a shark attack is almost completely random, since both visibility and odor rapidly lose their significance through distance.

The device of the instant invention will isolate a human from the open sea about him so as to eliminate any requirement for motion, thereby presenting neither sight nor sound to attract a shark as well as reduce any olfactory appeal thereto.

Accordingly, it is a primary object of this invention to provide a simple inexpensive anti-shark device for the safety of humans which is unattractive to sharks by eliminating or diminishing motion, sound and visibility thereof as well as limiting olfactory attraction thereto.

Another object of the invention is to provide an anti-shark safety device for humans which is comprised of an integral self-contained safety device requiring no additional or extraneous assistance in the operation thereof.

Still another object of the invention is to provide an anti-shark safety device for humans which is immersible and floatable in water.

Still another object of the invention is to provide a method for making a simple inexpensive anti-shark device for the safety of humans which is unattractive to sharks by eliminating or diminishing motion, sound and visibility thereof as well as limiting olfactory attraction thereto.

Still another object of the invention is to provide a method for making an anti-shark safety device for humans which is comprised of an integral self-contained safety device requiring no additional or extraneous assistance in the operation thereof.

Yet another object of the invention is to provide a method for making an anti-shark safety device for humans which is immersible and floatable in water.

Other objects and advantages of the invention will become apparent from the following description taken in conjunction with the accompanying drawings, in which:

FIG. 1 is a top plan view of the flat material of the first construction being folded upon itself, but prior to the seaming of the ends thereof;

FIG. 2 is an elevational view of the flat material of FIG. 1 after seaming the ends thereof;

FIG. 3 is a perspective view of the flat material of FIGS. 1 and 2 after folding the upper edge upon the lower edge and seaming the same together;

FIG. 4 is an elevational view of the flat material of the second construction showing one edge thereof being folded over;

FIG. 5 is an elevational view of the flat material of FIG. 4 illustrating the folded edge thereof provided with a plurality of slits;

FIG. 6 is an elevational view of the second construction showing the ends thereof seamed together and the continuous hollow member of the first construction positioned thereabout;

FIG. 7 is an elevational view of the second construction of FIG. 6 showing the continuous hollow member of the first construction encompassed within the slit area of the second construction, and further showing the free edge of the second construction seamed upon itself so as to form a second continuous hollow member about the second construction; and FIG. 8 is a top perspective view of the completed device immersed in salt water or the like.

FIG. 9 is a top perspective view showing another embodiment of the invention.

Referring more particularly to FIGS. 1–3, the formation of the first construction consists of seaming together two ends, 20a and 20b, of a flat pliable material 20. The upper edge 20c thereof is then folded down upon the lower edge 20d and seamed together. This construction may result in a continuous hollow member 21 having a "donut" configuration, or in the alternate the continuous hollow member may be formed in any regular or irregular configuration. Any conventional inflation and deflation means is then provided to the continuous member (here shown as a conventional air valve 21a).

The second construction (see FIGS. 5–9) is obtained by folding over a substantial portion of the edge 22a of a second flat pliable material 22 which is longer than the first flat material so that when the continuous hollow member 27 is formed, it will be larger than the first hollow member 21, thus permitting the aforesaid first continuous hollow member to nest within the second. The folded edge 24 of the second flat material 22 is slit (as at 25) from the edge 24 inwardly in a plurality of positions. It should be noted that said slits 25, however, do not extend completely to edge 22a of the material 22, but terminate short thereof. The ends 22b and 22c of the material 22 are then seamed together to provide a hollow cylindrical body 26. The second construction is then inserted through the first construction (the latter being in a continuous hollow form 21).

The upper edge 22a of the second construction is then pulled down over the outside of the first hollow member 21 so that the latter is encompassed within the slit area of the second construction. The second construction is then seamed upon itself below the slits 25 thereby enclosing the first hollow member 21. Edge 22a of the second construction is then seamed to cylindrical form 26 thereby producing a second hollow member 27. Again, any conventional inflation and deflation means is provided to the second hollow member as conventional air valve 27a.

A bottom 28 is subsequently formed (herein shown as a prepared bottom seamed to the opposite edge 22d of the body 26 of the second construction), thereby defining a cup-like structure having an open upper end provided with floatation means. Bottom 28 may be provided with small openings 28a to permit the entrance of sea water or the like thereby allowing the device to be freely suspended. Flaps 29 may be seamed adjacent each opening 28a to limit the flow of liquid from inside the device out into the area surrounding the device.

Alternatively, as illustrated in FIG. 9, the opposite edge of body 26 of the second construction may be seamed together to provide bottom 28 thereby eliminating the necessity of securing an extraneous or separate bottom to the said opposite edge 22d of body 26. For optimum results, the external surface of the tank is preferably dark and may be coated with currently known substances unappealing to sharks.

FIG. 8 illustrates the completed anti-shark safety device immersed in sea water, or the like. Although the floatation means are shown positioned in a plane of approximately 45° from the horizontal, they may be both positioned in other planes without deviating from the principles of the invention herein. Regardless of the plane in which the hollow members are positioned, the stability of the floatation means in that plane is increased when the device is in use.

It is obvious from a description of the foregoing structure that a simple inexpensive anti-shark device is disclosed which may be quickly inflated or deflated. When deflated the device may be formed into an extremely compact package facilitating the storage thereof. It is also obvious that the device has the additional advantage of being adapted to accommodate one or a number of persons with ease.

While one embodiment of the invention and a method for making the same has been described, it is understood that the particular embodiment of the invention and method for making the same herein disclosed is for illustrative purposes only and that various changes may be made therein without departing from the principles of the invention of the annexed claims.

I claim:
1. An anti-shark safety device, comprising:
   a first continuous hollow member;
   a wall member secured to said first hollow member and extending downwardly therefrom;
   a bottom secured to said wall member;
   a second continuous hollow member secured to and nested within said first hollow member; and
   means for inflating and deflating said first hollow member and said second hollow member.
2. An anti-shark safety device as described in claim 1 wherein said first and second hollow members are circular.
3. An anti-shark safety device as described in claim 1 wherein said first and second hollow members are intersected by the same horizontal plane.
4. An anti-shark safety device comprising:
   a first continuous hollow member;
   a wall member secured to said first hollow member and extending downwardly therefrom;
   a bottom secured to said wall member, said bottom being apertured so as to permit the passage of a liquid therethrough and being provided with flaps for limiting the amount of said liquid passing therethrough from within the device;
   a second continuous hollow member secured to said first hollow member; and
   means for inflating and deflating said first hollow member and said second hollow member.
5. An anti-shark safety device as described in claim 4 wherein, said second hollow member is nested within said first hollow member.
6. An anti-shark safety device as described in claim 1 wherein said bottom is formed by sealing together the ends of said wall member.
7. An anti-shark safety device as described in claim 1 wherein the outer surface thereof is dark.
8. The method of making an anti-shark safety device having a first and a second continuous hollow wall member and integral bottom, comprising the steps of:
   seaming together the ends of a first elongated flat pliable material;
   folding the upper edge thereof over the lower edge thereof and seaming the same together so as to form a first continuous hollow tube;
   folding the upper edge of a second elongated flat pliable material over the lower edge thereof, said elongated material having a dimension greater than that of the first elongated material;
   slitting the folded edge of said elongated flat material so that said slits extend inwardly from said folded edge;
   seaming together the ends of said second elongated flat material so as to form the hollow shell;
   inserting the hollow shell through the first hollow tube;
   pulling the upper edge of the second material over the outside of the first hollow tube so that the latter is enclosed within the slit area;
   seaming the edges of the hollow shell adjacent to the slits of said hollow shell so as to form a second continuous hollow tube;

enclosing the free edge of said hollow shell so as to provide a bottom thereto; and providing inflating and deflating means to said first and said second continuous hollow tubes.

9. The method of making an anti-shark safety device as described in claim 8 wherein the second continuous hollow tube is formed so as to be intersected by the same horizontal plane as intersects the first continuous hollow tube.

10. The method of making an anti-shark safety device as described in claim 8 wherein the bottom is provided by seaming together the free edge of the hollow shell.

11. The method of making an anti-shark safety device as described in claim 8 wherein the bottom is provided by seaming a prepared bottom to the free edge of the hollow shell.

12. The method of making an anti-shark safety device as described in claim 11 wherein the prepared bottom is first perforated to permit passage of liquid therethrough and each perforation is provided with flaps positioned adjacent thereto so as to limit the amount of liquid passing therethrough from within the device.

References Cited

UNITED STATES PATENTS

| | | |
|---|---|---|
| 2,358,192 | 9/1944 | Tregilgas _____ 9—314 X |
| 2,508,304 | 5/1950 | Sturtevant. |
| 2,327,168 | 8/1943 | Bucknell. |
| 2,327,169 | 8/1943 | Bucknell. |
| 2,749,560 | 6/1956 | Craft _____ 9—11 |
| 3,001,207 | 9/1961 | Nail. |

FOREIGN PATENTS 1,349,458  12/1962  France.

MILTON BUCHLER, Primary Examiner

JEFFREY L. FORMAN, Assistant Examiner

U.S. Cl. X.R.

4—171; 9—311